United States Patent
Lin et al.

(10) Patent No.: US 9,904,561 B2
(45) Date of Patent: Feb. 27, 2018

(54) COMPUTER SYSTEM AND METHOD FOR SETTING BIOS

(71) Applicant: Quanta Computer Inc., Tao Yuan Shien (TW)

(72) Inventors: Ping-Liang Lin, New Taipei (TW); Yung-Fu Li, Taoyuan County (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 373 days.

(21) Appl. No.: 14/454,025

(22) Filed: Aug. 7, 2014

(65) Prior Publication Data
US 2015/0355913 A1   Dec. 10, 2015

(30) Foreign Application Priority Data

Jun. 10, 2014  (TW) .............................. 103120005 A

(51) Int. Cl.
G06F 9/44       (2006.01)
G06F 9/445      (2018.01)

(52) U.S. Cl.
CPC ........ G06F 9/44505 (2013.01); G06F 9/4416 (2013.01)

(58) Field of Classification Search
CPC ............................ G06F 9/44505; G06F 9/4416
See application file for complete search history.

(56) References Cited

U.S. PATENT DOCUMENTS

| | | | | |
|---|---|---|---|---|
| 2007/0101115 A1* | 5/2007 | Murakami | ................ | G06F 8/65 713/1 |
| 2007/0169076 A1* | 7/2007 | Desselle | ................... | G06F 8/65 717/168 |
| 2007/0233833 A1* | 10/2007 | Wang | ..................... | H04L 41/04 709/223 |
| 2010/0228960 A1* | 9/2010 | Huang | ..................... | G06F 8/65 713/100 |
| 2013/0254527 A1* | 9/2013 | Zhang | ................... | G06F 9/4401 713/100 |

FOREIGN PATENT DOCUMENTS

CN   103793238 A   5/2014
TW   201115360 A   5/2011

OTHER PUBLICATIONS

Taiwanese Office Action dated Jul. 21, 2015.

* cited by examiner

*Primary Examiner* — Thomas Lee
*Assistant Examiner* — Vincent Chang
(74) *Attorney, Agent, or Firm* — Rabin & Berdo, P.C.

(57) ABSTRACT

A computer system and a method for setting basic input/output system (BIOS) are disclosed. The computer system comprises a remote computer and servers. The remote computer transmits a setting command. Each of the servers comprises a first management unit and a motherboard. The motherboard comprises a storage device and a processor. The storage device stores the BIOS. The processor executes the BIOS. The processor communicates with the first management unit to determine whether the BIOS configuration needs to be updated after the server rebooted. The processor updates the BIOS according to the setting command when the BIOS configuration must to be updated.

10 Claims, 3 Drawing Sheets

COMPUTER SYSTEM AND METHOD FOR SETTING BIOS

This application claims the benefit of Taiwan application Serial No. 103120005, filed Jun. 10, 2014, the subject matter of which is incorporated herein by reference.

BACKGROUND OF THE INVENTION

Field of the Invention

The invention relates in general to an electronic device, and more particularly to a computer system and a method for setting basic input/output system (BIOS).

Description of the Related Art

In a rack-mounted server system, every server has a basic input output system (BIOS). When the system is booted, each server loads the related setting values into the BIOS, and executes a boot process according to the setting values. If the user wants to change a setting value of a configuration option of the BIOS, the user has to enter a configuration option menu of the BIOS interface of each server one by one and manually change the setting value of the configuration option of the BIOS. However, the above method is troublesome and time-consuming.

SUMMARY OF THE INVENTION

The invention is directed to a computer system and a method for setting basic input/output system (BIOS).

According to one embodiment of the present invention, a computer system is disclosed. The computer system comprises a remote computer and a plurality of servers. The remote computer transmits a setting command. Each of the servers comprises a first management unit and a motherboard. The first management unit stores the setting command. The motherboard comprises a storage device and a processor. The storage device stores the BIOS. The processor executes the BIOS, and further communicates with the first management unit to determine whether a configuration of the BIOS needs to be updated after the server rebooted. If the configuration of the BIOS needs to be updated, the processor updates the BIOS according to the setting command.

According to another embodiment of the present invention, a method for setting BIOS is disclosed. The method for setting BIOS comprises transmitting a setting command; storing the setting command to a first management unit; communicating with the first management unit by the processor to determine whether a configuration of the BIOS needs to be updated after the server is rebooted; updating the BIOS according to the setting command if the configuration of the BIOS needs to be updated.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
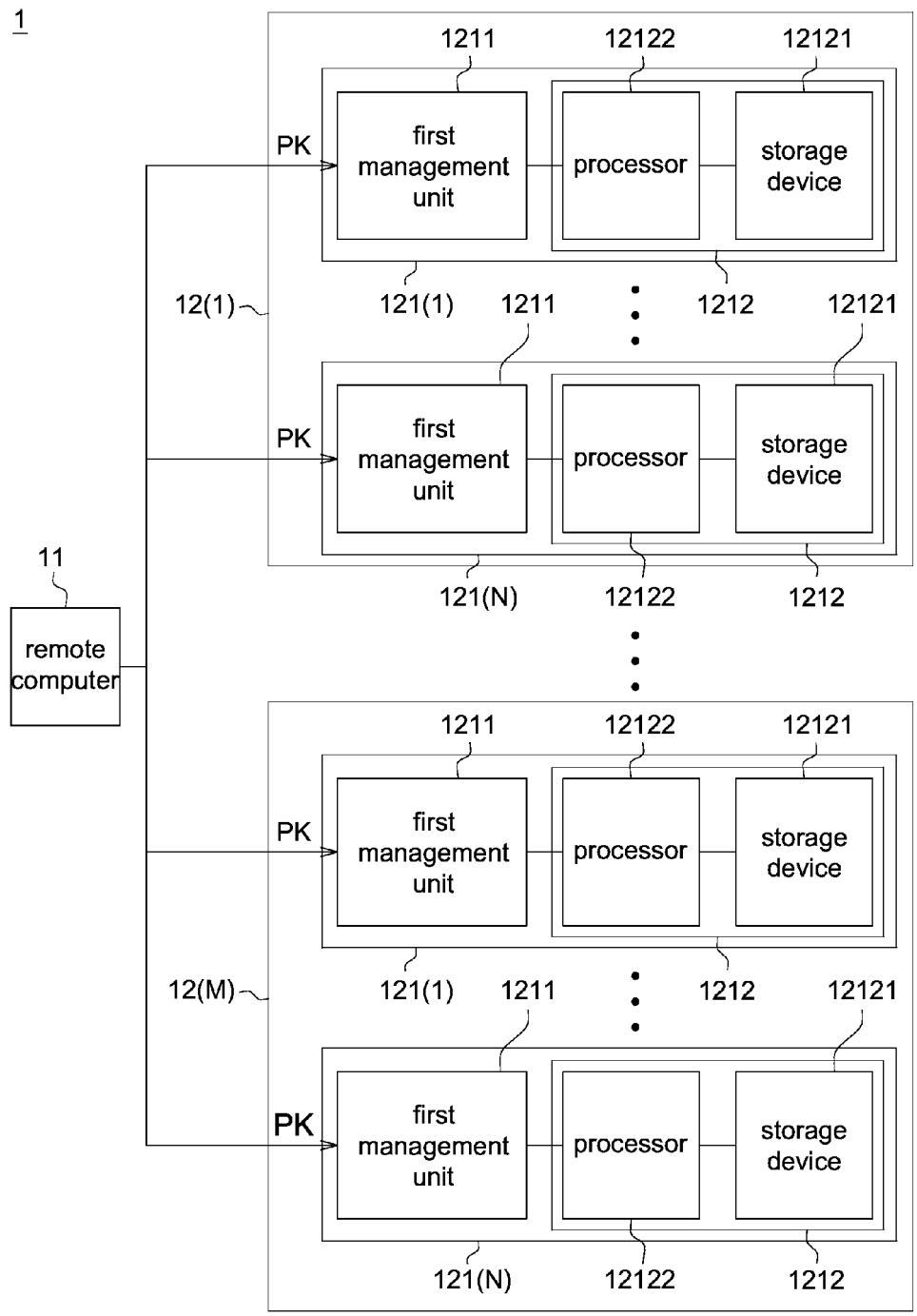
FIG. 1 is a block diagram of a computer system according to a first embodiment.

Referring to FIG. 1, a block diagram of a computer system according to a first embodiment is shown. The computer system 1 comprises a remote computer 11 and M rack-mounted server systems 12(1)~12(M), wherein M is a positive integer greater than 1. Each of the rack-mounted server systems 12(1)~12(M) comprises N servers 121(1) ~121(N), wherein N is a positive integer greater than 2. Each of the servers 121(1)~121(N) comprises a first management unit 1211 and a motherboard 1212. The motherboard 1212 comprises a processor 12122 and a storage device 12121. The first management unit 1211 can be realized by such as a baseboard management controller (BMC). The user can use the remote computer 11 to transmit a setting command PK. The setting command PK is used for resetting the basic input/output system (BIOS). The setting command PK comprises a setting value of a configuration option of the BIOS. The remote computer 11 can be realized by such as a PC or a server. The setting command is such as an intelligent platform management interface (IPMI) command, a simple network management protocol (SNMP) command or other interface.

The remote computer 11 transmits the setting command PK to the first management unit 1211 via the network. The first management unit 1211 stores the setting command PK. The storage device 12121 stores the BIOS. The processor 12122 executes the BIOS, and further determines whether the BIOS needs to be updated after the server rebooted. If the configuration of the BIOS needs to be updated, the processor 12122 updates the BIOS according to the setting command PK.

Figure 2:
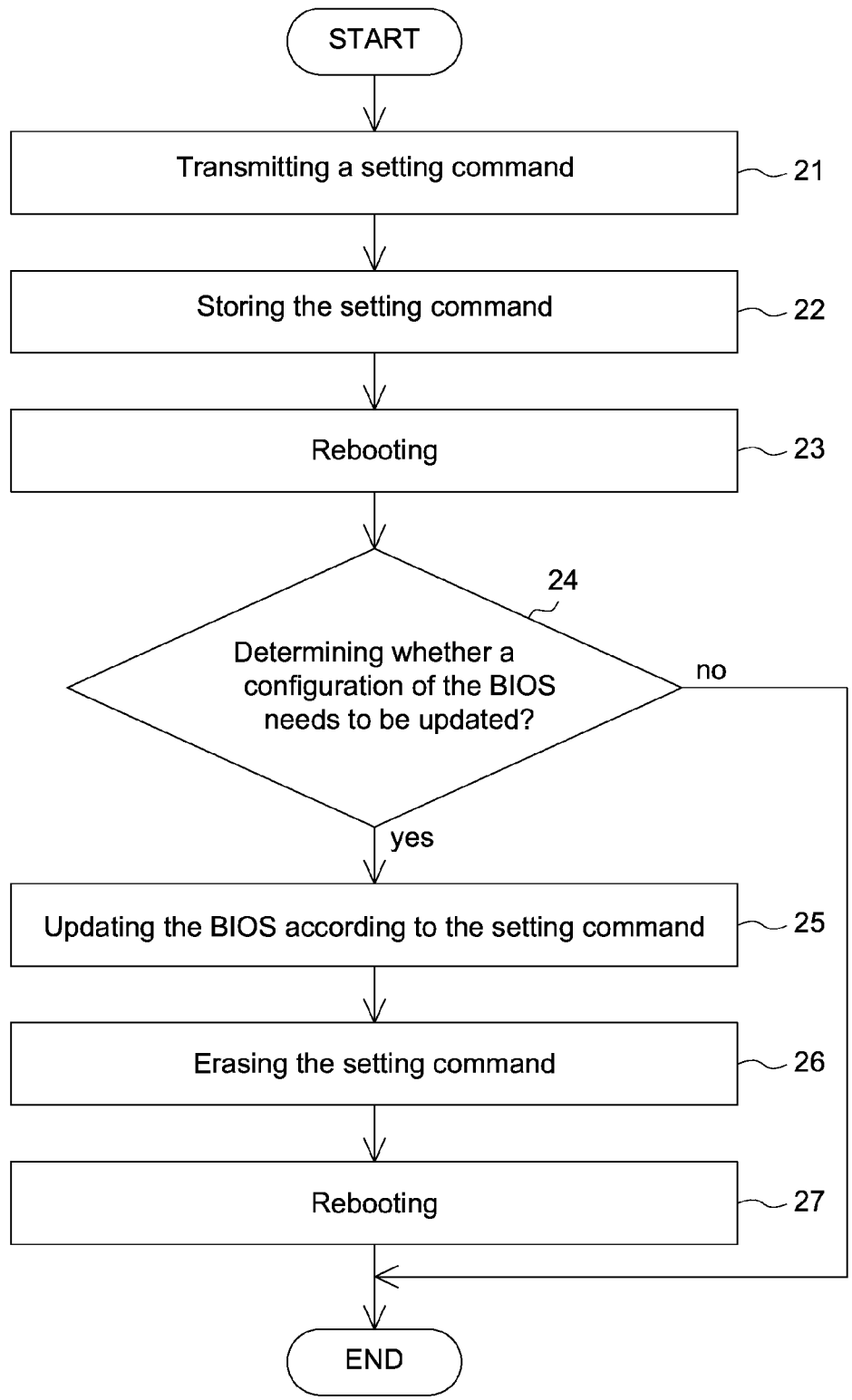
FIG. 2 is a flowchart of a method for setting BIOS according to a first embodiment.

Refer to FIG. 1 and FIG. 2, FIG. 2 is a flowchart of a method for setting BIOS according to a first embodiment. The method for setting BIOS is applicable to the computer system 1. The method comprises following steps. Firstly, the method begins at step 21, the remote computer 11 transmits the setting command PK to the first management unit 1211 of each of the servers 121(1)~121(N) via the network. Next, the method proceeds to step 22, each of the servers 121(1)-121(N) stores the setting command PK to a corresponding first management unit 1211. Then, the method proceeds to step 23, the servers 121(1)~121(N) are rebooted. In step 23, the servers 121(1)~121(N) can be rebooted directly after the setting command PK is stored to the first management unit 1211. Or, the servers 121(1)~121(N) are rebooted after the user sends a reboot command to the servers 121(1)~121(N) via the remote computer.

Then, the method proceeds to step 24, the processor 12122 communicates with the first management unit 1211 to determine whether a configuration of the BIOS needs to be updated after the server rebooted. If the configuration of the BIOS does not need to be updated, the method terminates. Conversely, if the configuration of the BIOS needs to be updated, then the method proceeds to step 25. In step 25, the processor 12122 of each of the servers 121(1)~121(N) updates the configuration of the BIOS according to the setting command PK. Then, the method proceeds to step 26, the processor 12122 informs the first management unit 1211 to erase the setting command stored in the first management unit to avoid executing the same process again in the next time when the server is rebooted. Then, the method proceeds to step 27, the servers 121(1)~121(N) of the motherboards 1212 are rebooted but the present disclosure is not limited thereto, In some embodiments, the above configuration can be completed without executing step 27.

Furthermore, since the first management unit 1211 stores the setting command PK, the processor 12122 needs to communicate with the first management unit 1211 to determine whether a configuration of the BIOS needs to be updated. If the configuration of the BIOS needs to be updated, the processor 12122 inquires of the first management unit 1211 which configuration options of the BIOS are available. After the first management unit 1211 responds with the configuration option(s) which the configuration of the configuration option(s) needs to be updated, the processor 12122 obtains the setting value(s) of the configuration option(s) from the first management unit 1211. The processor 12122 sets the configuration option(s) according to the setting value(s) to update the configuration(s) of the BIOS.

Second Embodiment

Figure 3:
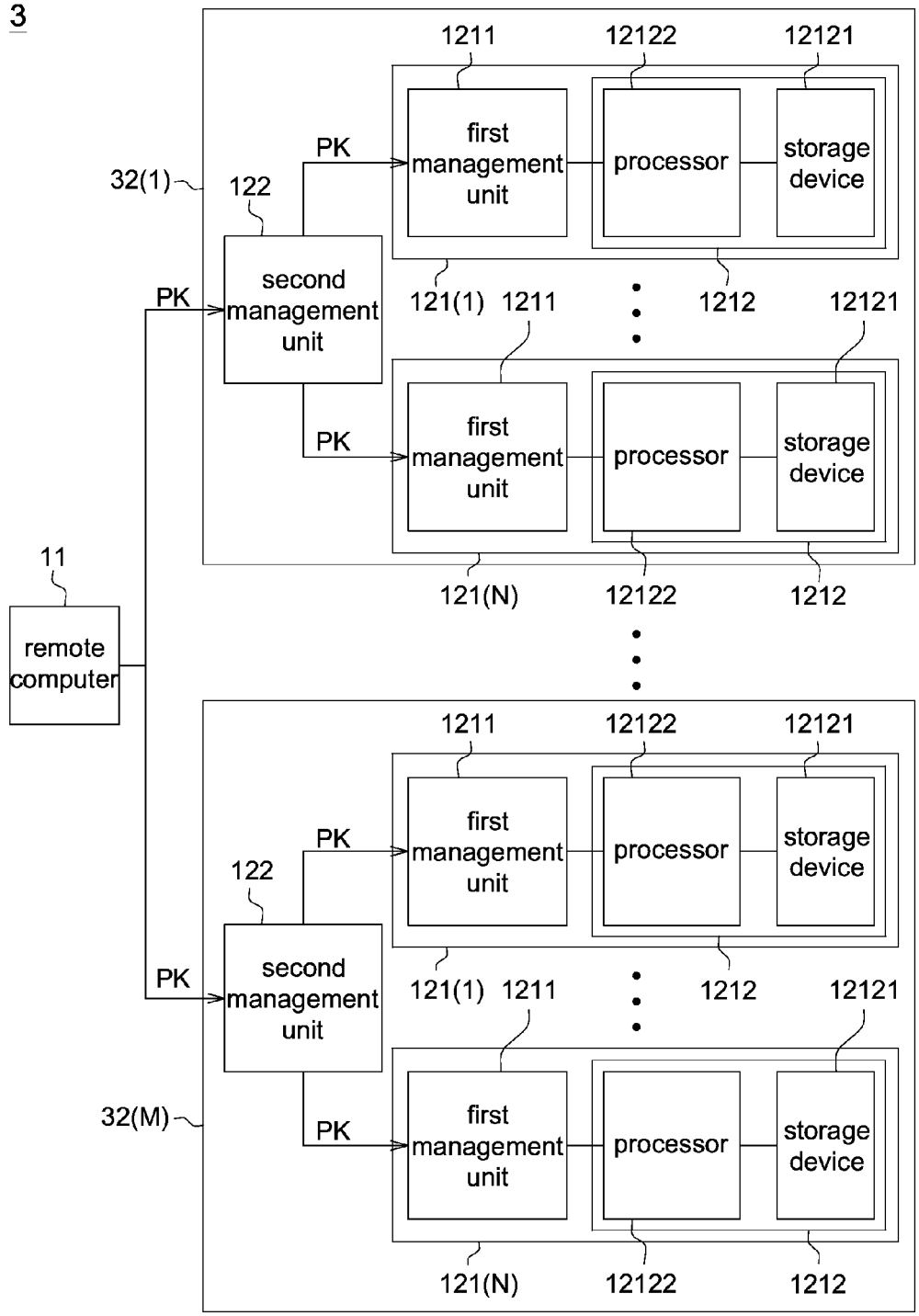
FIG. 3 is a block diagram of a computer system according to a second embodiment.

Referring to FIG. 3, a block diagram of a computer system according to a second embodiment is shown. The second embodiment is different from the first embodiment mainly in that each of the rack-mounted server systems 32(1)~32(M) of the computer system 3 comprises a second management unit 122. The second management unit 122 is different from the first management unit 1211. The second management unit 122 can be realized by such as a rack management controller (RMC). The setting command PK is transmitted to the second management unit 122 by the remote computer 1, and then the setting command PK is further transmitted to the first management unit 1211 by the second management unit 122.

Conventional setting method is incapable of completing the BIOS configuration of multiple servers within a short period of time. The user has to enter the BIOS interface of each server and manually set the configuration options of the BIOS one by one. In comparison to the conventional setting method, the setting method disclosed in above embodiments allows the user to complete the BIOS configuration of multiple servers together at a remote computer without having to enter the BIOS interface of each server and manually set the configuration options of the BIOS one by one.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for setting BIOS, comprising:
    transmitting a setting command;
    storing the setting command to a first management unit;
    after rebooting a server, communicating with the first management unit by a processor to determine whether a configuration of the BIOS needs to be updated; and
    updating the BIOS according to the setting command if the configuration of the BIOS needs to be updated;
    wherein the updating step comprises:
        inquiring of the first management unit at least one configuration option of the BIOS;
        obtaining a setting value of the configuration option from the first management unit; and
        setting the configuration option according to the setting value.

2. The setting method according to claim 1, further comprising:
    rebooting the server after the BIOS is updated.

3. The setting method according to claim 1, further comprising:
    erasing the setting command stored to the first management unit by the first management unit after the configuration of the BIOS is updated.

4. The setting method according to claim 1, wherein in the transmitting step, a remote computer transmits the setting command to the first management unit.

5. The setting method according to claim 1, wherein the transmitting step comprises:
    transmitting the setting command to a second management unit by a remote computer, wherein the second management unit is different from the first management unit; and then
    transmitting the setting command to the first management unit by the second management unit.

6. A computer system, comprising:
    a remote computer for transmitting a setting command;
    a plurality of servers, each comprising:
    a first management unit for storing the setting command;
    a motherboard, comprising:
    a storage device for temporarily storing a BIOS;
    a processor for executing the BIOS and communicating with the first management unit to determine whether a configuration of the BIOS needs to be updated, wherein the processor updates the BIOS according to the setting command if the configuration of the BIOS needs to be updated, wherein the processor inquires of the first management unit at least one configuration option of the configuration of the BIOS, and after the processor obtains a setting value of the configuration option from the first management unit, the processor sets the configuration option according to the setting value.

7. The computer system according to claim 6, wherein the server is rebooted after the BIOS is updated.

8. The computer system according to claim 6, wherein the processor informs the first management unit to erase the setting command stored in the first management unit after the BIOS is rebooted.

9. The computer system according to claim 6, wherein the setting command is transmitted to the first management unit by the remote computer.

10. The computer system according to claim 6, wherein after the setting command is transmitted to a second management unit by the remote computer, the setting command is further transmitted to the first management unit by the second management unit, and the second management unit is different from the first management unit.

* * * * *